United States Patent [19]

Sato

[11] Patent Number: 4,978,205
[45] Date of Patent: Dec. 18, 1990

[54] VIBRATION-ISOLATING OPTICAL SYSTEM

[75] Inventor: Susumu Sato, Chiba, Japan

[73] Assignee: Nikon Corporation, Tokyo, Japan

[21] Appl. No.: 487,307

[22] Filed: Mar. 2, 1990

[30] Foreign Application Priority Data

Mar. 7, 1989 [JP] Japan .................................. 1-54470

[51] Int. Cl.$^5$ .......................... G02B 15/14; G02B 7/02
[52] U.S. Cl. ...................................... 350/423; 350/252
[58] Field of Search ................. 350/423, 427, 252-257

[56] References Cited

U.S. PATENT DOCUMENTS

| | | | |
|---|---|---|---|
| 4,100,404 | 7/1978 | Johnson et al. .................. | 350/423 X |
| 4,802,746 | 2/1989 | Baba et al. ....................... | 350/419 X |

FOREIGN PATENT DOCUMENTS

| | | |
|---|---|---|
| 41-8558 | 5/1966 | Japan . |
| 56-23125 | 5/1981 | Japan . |
| 63-201623 | 8/1988 | Japan . |

Primary Examiner—Scott J. Sugarman
Attorney, Agent, or Firm—Shapiro and Shapiro

[57] ABSTRACT

A vibration-isolating optical system having an image stabilizing function, comprising: a fixed lens optical system having a plurality of lens groups which are arranged to be stationary in the vertical direction with respect to the optical axis; and a vibration-isolating compensating optical system disposed adjacently to the image of the fixed lens optical system and arranged to be movable in a direction intersecting the optical axis, wherein the vibration-isolating compensating optical system is constituted by, in sequence order from the portion adjacent to the object, a first factor formed by a double convex positive lens, a second factor formed by a negative lens whose concave confronts the object and a third factor formed by a positive lens, the vibration-isolating compensating optical system being arranged so as to meet the following relationships, assuming that the power (the reciprocal of the focal length) of the overall body of the vibration-isolating compensating optical system is $\phi$, the power of the first factor is $\phi$, the power of the first factor is $\phi_1$, the power of the second factor is $\phi_2$ and the combination power of the first factor and the second factor is $\phi_{12}$: $|\phi_{12}| \leq 0.3 \phi$; $-0.5 \leq (\phi/\phi_2) + 1 \leq 1.0$; and $-0.3 \leq (\phi_2/\phi_1) + 1 \leq 0.3$.

18 Claims, 4 Drawing Sheets

VIBRATION-ISOLATING OPTICAL SYSTEM

BACKGROUND OF THE INVENTION

1. Field of the Invention

The present invention relates to a vibration-isolating optical system having a so-called vibration isolating function capable of optically compensating blurring of a photographed image due to vibrations. More particularly, the present invention relates to a vibration-isolating optical system capable of compensating image blurring due to the shaking of the camera when an image is photographed through the imaging optical system and also of compensating image blurring when an image to photographed by the imaging optical system loaded on a portion such as an automobile or a helicopter which is being vibrated.

2. Related Background Art

Hitherto, a system of the type capable of optically compensating image blurring has been known as disclosed in (1) Japanese Patent Publication No. 56-23125 in which it is employed in an automatic vertical optical device. According to this disclosure, the optical axis is vertically compensated by causing a prism effect to be changed by relatively rotating the positive and negative lenses in an optical system along the interacting lens surfaces. Another system has been disclosed in (2) Patent Publication No. 41-8558 in which the nodal Japanese point is shifted and the image formation point is thereby compensated by causing a portion of the lenses in the optical system to be eccentric with respect to the optical axis.

However, the structure disclosed in the above-described Japanese Patent Publication (1) encounters a problem in the deterioration in the imaging performance because the aberration excessively deteriorates when the positive lens and the negative lens have been made eccentric to each other and the aberration change is too large to serve as an ordinary imaging optical system. As a result, it has not been put into practical use as a satisfactory imaging optical system. According to the above-described Japanese Patent Publication (2), only the principal structure was disclosed and there has not been a description of the aberration compensation to be made at the time of compensating the eccentricity.

Another structure has been disclosed in, for example, Japanese Patent Laid-Open No. 63-201623 in which the aberration when the eccentric state has been realized is compensated to some extent by using the principle disclosed in the above-described Japanese Patent Publication (2).

However, the structure disclosed in it suffers from a problem in that the substantial overall length of the eccentricity-compensating optical system is too great and the compensating optical system and that of the holding mechanism therefor thereby become too heavy. As a result, the actuator for operating the compensating optical system and the holding mechanism therefor is heavily loaded.

SUMMARY OF THE INVENTION

The present invention has been established so as to overcome the above-described problems. Therefore, an object of the present invention is to provide a vibration-insulating optical system provided with a vibration-insulating compensating optical system capable of extremely effectively insulating vibrations only with a reduced size and weight and maintaining satisfactory imaging performance in any time before and during the compensation of the vibration-insulating compensating optical system.

In order to achieve the above-described object, according to the present invention, there is provided a vibration-isolating optical system comprising: a fixed lens optical system having a plurality of lens groups which are arranged to be stationary in the vertical direction with respect to the optical axis; and a vibration-isolating compensating optical system disposed adjacently to the image of the fixed lens optical system and arranged to be movable perpendicularly to the optical axis, wherein the vibration-isolating compensating optical system is constituted by, in sequence order from the portion adjacent to the object, a first factor formed by a double convex positive lens, a second factor formed by a negative lens whose concave confronts the object and a third factor formed by a positive lens, the vibration-isolating compensating optical system being arranged so as to meet the following relationships, assuming that the power (the reciprocal of the focal length) of the overall body of the vibration-isolating compensating optical system is $\phi$, the power of the first factor is $\phi_1$, the power of the second factor is $\phi_2$ and the combination power of the first factor and the second factor is $\phi_{12}$:

$$|\phi_{12}| \leq 0.3\,\phi$$

$$-0.5 \leq \frac{\phi}{\phi_2} + 1 \leq 1.0$$

$$-0.3 \leq \frac{\phi_2}{\phi_1} + 1 \leq 0.3$$

In the above-described case in which "the vibration-insulating compensating optical system is movable perpendicularly to the optical axis" includes not only a case where the vibration-insulating compensating optical system is made eccentric vertically (so-called shifted) with maintaining the parallel relationship between the optical axis of the vibration-insulating compensating optical system and the optical axis of the overall body of the vibration-insulating optical system including the fixed lens group, but also a case in which it is made eccentric in such a manner that the optical axis of its vibration-insulating compensating optical system is tilted with respect to the overall body of the vibration-insulating optical system.

It is preferable that the luminous flux made incident upon the vibration-insulating compensating optical system be substantial parallel luminous flux. In order to realize this, it is preferable that the fixed lens group disposed adjacent to the object in the vibration-insulating compensating optical system and stationary in the direction perpendicular to the optical axis forms a substantial afocal system.

According to the present invention, there is provided a vibration-insulating compensating optical system capable of maintaining satisfactory imaging performance in any time before and during the compensation of the vibration-insulating compensating optical system only with a reduced size and weight. Since the vibration-insulating compensating optical system can be reduced in size and weight with respect to the overall body of the imaging optical system, the load of the operation device for the vibration-insulating compensating optical system can be reduced. Furthermore, it can be formed as so-called a tacking device capable of always framing a specific subject to a predetermined position.

Other and further objects, features and advantages of the invention will be appear more fully from the following description made with reference to the drawings

DESCRIPTION OF THE PREFERRED EMBODIMENTS

Figure 1:
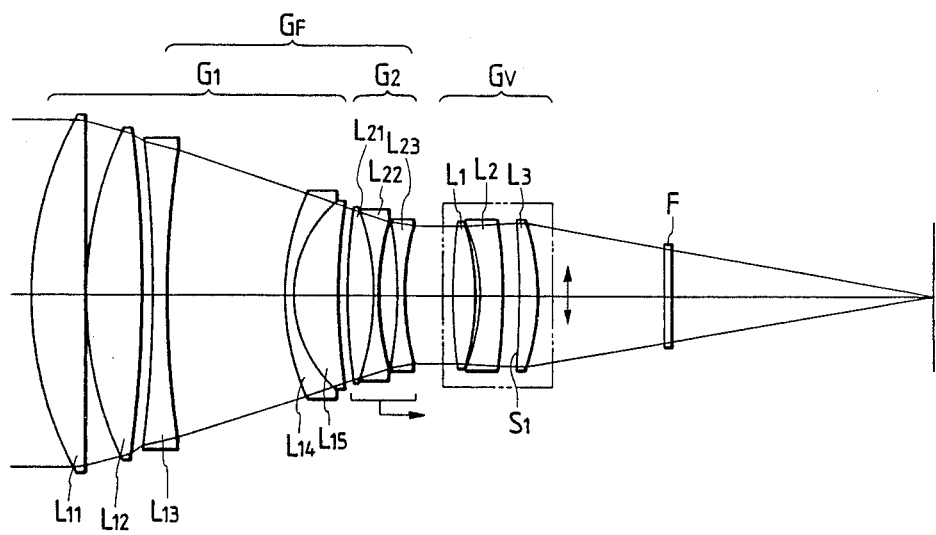
FIG. 1 is a structural view which illustrates a first embodiment of an optical system according to the present invention.

Preferred embodiments of the present invention will now be described in detail with reference to the drawings.

Each of the embodiments comprises, in sequence order from the portion adjacent to the object, a lens group GF which is arranged to be stationary in the vertical direction with respect to the optical axis, and a vibration-isolating compensating optical system Gv arranged to be movable perpendicularly to the optical axis. The vibration-isolating compensating optical system Gv is constituted by, in sequence order from the portion adjacent to the object, a first factor $L_1$ formed by a double convex positive lens, a second factor $L_2$ formed by a negative lens whose concave confronts the object and a third factor $L_3$ formed by a single positive lens or a combination or a laminated positive lens of a negative lens and a positive lens. The vibration-isolating compensating optical system is arranged so as to meet the following relationships, assuming that the power (the reciprocal of the focal length) of the overall body of the vibration-isolating compensating optical system is $\phi$, the power of the first factor is $\phi_1$: the power of the second factor is $\phi_2$ and the combination of the power of the first factor and the second factor is $\phi_{12}$:

$$|\phi_{12}| \leq 0.3\phi \quad (1)$$

$$-0.5 \leq \frac{\phi}{\phi_2} + 1 \leq 1.0 \quad (2)$$

-continued $$-0.3 \leq \frac{\phi_2}{\phi_1} + 1 \leq 0.3 \quad (3)$$

In this state, the vibration-insulating compensating optical system Gv may be moved in such a manner that the optical axis of the vibration-insulating compensating optical system Gv is made eccentric (a so-called "shift") in parallel to the optical axis of the overall body of the vibration-insulating optical system including the fixed lens group GF. Alternatively, it may be eccentrically moved (a so-called "tilted") in such a manner that the optical axis of the vibration-insulating compensating optical system Gv is tilted with respect to the optical axis of the overall body of the vibration-insulating optical system. It is preferable that the luminous flux to be made incident upon the vibration-insulating compensating optical system Gv be made substantially parallel flux. In order to realize this, it is preferable that the fixed lens group GF be arranged to be a substantially afocal optical system. In the case where the vibration-insulating compensating optical system Gv is not made eccentric, it is effective to compensate the aberration generated in the vibration-insulating compensating optical system Gf is compensated in the forward fixed lens group GF so as to satisfactorily compensate the aberration as the overall body of the optical system. The reason for this lies in that the fixed lens group GF adjacent to the object and the vibration-insulating compensating optical system Gv are disposed coaxially to each other and it cannot thereby be moved perpendicularly to the optical axis. The vibration-insulating optical system of a type according to the present invention is constituted in such a manner that the optical axis of the fixed lens group GF positioned adjacent to the object and that of the rearward vibration-insulating compensating optical system Gv are made coaxial at the time of the ordinary photographing However, the vibration-insulating compensating optical system Gv is made eccentric with respect to the optical axis of the vibration-insulating optical system by being vertical moved or rotary moved when the image blurring is compensated Taking this state into consideration, the balance established between the fixed lens group GF and the vibration-insulating compensating optical system Gv is caused to be lost significantly. Therefore, the obtainable aberration as the overall body of the optical system becomes insufficient. Therefore, the fixed lens group GF adjacent to the object and the vibration-insulating compensating optical system Gv must be independently aberration-compensated in order to reduce the aberration change due to the eccentricity compensation operation by eliminating the aberration dependency between the fixed lens group GF and the vibration-insulating compensating optical system Gv.

Therefore, according to the present invention, the vibration-insulating compensating optical system Gv is constituted by, in sequence order from the portion adjacent to the object, a first factor $L_1$ formed by a double convex positive lens, a second factor $L_2$ formed by a negative lens whose concave confronts the object and a positive lens third factor $L_3$ formed by a single lens or a combination of a positive lens and a negative lens As a result, the aberration compensation operation of the vibration-insulating compensating optical system can be extremely satisfactorily performed and its size can be reduced significantly. That is, assuming that light made incident, in parallel to the optical axis, upon the lens surface adjacent to the object is called "Rand light", the Rand light made incident upon the first factor $L_1$ of the vibration-insulating compensating optical system Gv is made substantially run parallel to the optical axis since the fixed lens group GF of the forward optical system is arranged to be substantially an afocal system. Therefore, the shape of the first factor $L_1$ must be in the form of a double convex shape because there is a necessity for the shape so as not to be considerably different from the shape which makes the minimal deflection angle to the Rand light considering the lens is a set of small prisms. It is most effective to compensate the aberration generated in the first factor $L_1$ of the positive lens by arranging the negative lens serving as the second factor $L_2$ to be positioned next to the first factor $L_1$ of the positive lens.

Since the overall body of the vibration-isolating compensating optical system Gv is arranged to be a positive lens group, it is therefore necessary for the structure to be arranged in such a manner that the largest number of lenses have positive power in order to prevent generation of the positive higher aberration factor from the vibration-isolating compensating optical system Gv. A structure arranged in such a manner that the third factor $L_3$ is constituted by a negative lens and a positive lens as an alternative to the sole positive lens will cause the vibration compensating optical system Gv to satisfactorily compensate various aberrations with a reduced size maintained.

In particular, the structure must be arranged in such a manner that the combined power $\phi_{12}$ of the first component factor $L_1$ and that of the second factor $L_2$ are arranged to meet the relationship expressed by the above-described Inequality (1). Inequality (1) expresses a fact that the power of the absolute value $\phi_{12}$ is smaller than that of the overall body of the vibration-isolating compensating optical system Gv. That is, a fact is shown that the power distribution of the vibration-isolating compensating optical system Gv is arranged in such a manner that the absolute value of the power of the third factor $L_3$ is sufficiently larger than the combined power $\phi_{12}$ of the power of the first factor $L_1$ and that of the second factor $L_2$. Therefore, a large portion of the overall power is distributed to the third factor $L_3$ and the non-axial aberration generated in the third factor $L_3$ can be compensated by a pair consisting of the first factor $L_1$ and the second factor $L_2$ each of which has small power. The reason for this lies in that the third factor $L_3$ having large power contributes to the aberration of the Rand light, while the first factor $L_1$ and the second factor $L_2$ each of which has small power considerably contribute to the non-axial aberration. Similarly, the aberration change of the non-axial light due to the lens group of the third factor $L_3$ caused from the eccentricity compensation can be satisfactorily compensated by the first factor $L_1$ and the second factor $L_2$. Furthermore, since the combined power of the first factor $L_1$ and the second factor $L_2$ is power of a relatively low level, width $D_2$ of the air layer between the second factor $L_2$ and the third factor $L_3$ can be relatively freely arranged. Therefore, the overall length of the vibration-isolating compensating optical system Gv can be shortened by reducing the width $D_2$ of the air layer. Furthermore, since the divergence effect is a relatively low level even if the combination of the first factor $L_1$ and the second factor $L_2$ is negative power and since the width $D_2$ of the air layer is a small value, the effective diameter of the third factor $L_3$ can be made a similar diameter as that of the factor $L_1$ and that of the second factor $L_2$. Therefore, it is necessary for the power of the first factor $L_1$ and that of the second factor $L_2$ to be reduced in the region which meets Inequality (1). As described above, the aberration change at the time of the eccentricity compensation can be controlled and the size of the vibration-insulating compensating optical system Gv can be reduced by arranging the power distribution of the vibration-insulating compensating optical system Gv to meet Inequality (1).

Then, the conditions for the above-described Inequalities (2) and (3) relating to the power $\phi$ of the overall body of the vibration-insulating compensating optical system Gv, power $\phi_1$ of the first factor $L_1$ and the power $\phi_2$ of the second factor $L_2$ will be described. Inequality (2) shows a proper range for $\phi_2$ with respect to $\phi$ for the purpose of compensating the aberration of the positive lens generated in the third factor $L_3$, the aberration being compensated by the negative lens of the second factor $L_2$. If the power $\phi_2$ exceeds the upper limit of Inequality (2), the aberration is excessively compensated by the lens having negative power, causing a necessity of a lens factor to be provided for the purpose of compensating the excessive aberration compensation. As a result, the structure of the vibration-insulating compensating optical system Gv cannot be simplified. If the power $\phi_2$ is lowered below the lower limit shown in Inequality (2), the aberration compensation performed by the lens having negative power becomes insufficient. Therefore, an additional lens having negative power must be provided for the purpose of compensating the lacking for the aberration compensation. As a result, it is difficult to simplify the structure of the vibration-insulating compensating optical system Gv.

Inequality (3) shows the relationship between the power of the first factor $L_1$ and that of the second factor $L_2$ in the power distribution determined in accordance with Inequalities (1) and (2). Since the first factor $L_1$ and the second factor $L_2$ are combined with each other and form an optical system approximating to an afocal system, Inequality (3) means the afocal magnification realized by the first factor $L_1$ and the second factor $L_2$ is made approximate to $-1$ considering that $\phi_2/\phi_1$ is an afocal magnification, where a fact that the value is lowered below the lower limit shown in Inequality (3) represents a fact that the afocal magnification exceeds $-1.3$. This means a fact that $\phi_1$ is made smaller than $|\phi_2|$. Therefore, when the first factor $L_1$ and the second factor $L_2$ are arranged to be a system approximating to an afocal system, the distance between the principal point of the first factor $L_1$ and that of the second factor $L_2$ is widened. As a result, the overall length of the combined system of the first factor $L_1$ and the second factor $L_2$ is inevitably lengthened. Therefore, the size of the structure cannot be reduced. On the other hand, a fact that the value exceeds the upper limit shown in Inequality (3) represents a fact that the afocal magnification is lowered below $-1.3$. Accordingly, the third factor $L_3$ must have power 1.43 times or more the power of the overall body of the vibration-insulating compensating optical system Gv. Therefore, the structure of the third factor $L_3$ cannot be reduced.

It is preferable that the power distribution for each of the factors be arranged in such a manner that the width $D_2$ of the air layer between the second factor $L_2$ and the third factor $L_3$ meets the following relationship:

$$0 \leq \phi \cdot D_2 \leq 0.1 \quad (4)$$

As a result, as in the description made about the conditions for Inequality (1), the length of the vibration-insulating compensating optical system Gv can be shortened, and the overall size can thereby be reduced. That is, if the value exceeds the upper limit shown in Inequality (4), the distance between the second factor $L_2$ and the third factor $L_3$ becomes too large, causing the overall length of the vibration-insulating compensating optical system Gv to be made too large. As a result, the weight of the mechanism for holding the vibration-insulating compensating optical system is made too heavy, causing the actuator is loaded heavily. Therefore, the aberration compensation cannot be performed quickly.

It is preferable that the structure according to the present invention be arranged in such a manner that the shape of the negative lens serving as the second factor $L_2$ is arranged such that the form factor $q_2$ meets the following relationship:

$$0.6 < q_2 < 6 \quad (5)$$

Assuming that the curvature radius of the surface of the lens factor confronting the object is ra and the curvature radius of it confronting the image is rb, the form factor q is expressed by:

$$q = (rb + ra) / (rb - ra)$$

The principal point of the second factor $L_2$ can be approached to the principal point of the first factor $L_1$ positioned in the lens of the first factor $L_1$ by arranging the shape of the second factor $L_2$ from a negative meniscus shape whose concave confronting the object to a double concave approximated to a plane concave. Therefore, a substantially afocal small size optical system formed by combining the first factor $L_1$ and the second factor $L_2$ can be constituted. If the value is lowered below the lower limit shown in Inequality (5), the compensation of the non-axial aberration of the third factor $L_3$ by the first factor $L_1$ and the second factor $L_2$ becomes insufficient. In particular, the upper comatic aberration is reduced to an excessively large negative value. As a result, asymmetry is inevitably made excessive. In order to satisfactorily reduce the distance between the principal point of the first factor $L_1$ and that of the second factor $L_2$ so as to reduce the size, it is preferable that the lower limit of the above-described condition be 1.

In the case where the value exceeds the upper limit shown in Inequality (5), the degree of bending of the second factor $L_2$ is made too large. As a result, the compensation of the aberration of the third factor $L_3$ is performed excessively. In particular, the degree of astigmatism is inevitably made an excessive positive value. Furthermore, higher aberration is excessively generated, and the aberration compensation cannot be maintained in a satisfactory state.

Assuming that the curvature radius of the surface of the third factor $L_3$ serving as the final component of the vibration insulating compensating optical system Gv which is nearest to the object is $R_l$, it is preferable that the following relationship be held:

$$-5.6 \times 10^{-6} < \frac{\phi_{12}}{R_1} < 1.5 \times 10^{-5} \quad (6)$$

The Inequality (6) shows the relationship between the combined power $\phi_{12}$ of the first factor $L_1$ and the second factor $L_2$ and $R_l$. Since, the third factor $L_3$ mainly contributes to the aberration of the Rand light, the shape of plane $S_1$ must be arranged so as to reduce the aberration of the Rand light generated in the third factor $L_3$ depending upon the incidental angle (divergent light or convergent light) of light made incident upon the third factor $L_3$. Therefore, in the case where the incidental light upon the third factor $L_3$ is divergent light, the plane $S_1$ must be, in principle, a concave or a plane approximated to a plane in order to bent the light at an angle approximated to the minimal deflection angle when it is provided that the lens is a set of small prisms.

In the contrary case in which the incidental light upon the third factor $L_3$ is convergent light, the shape must be a convex confronting the object or a plane approximated to a plane. If the plane $S_1$ is not arranged to be a plane with which light is refracted at an angle near the minimal deflection angle, it is difficult to reduce the aberration of the Rand light generated in the third factor $L_3$. Therefore, it is difficult to simplify the structure of the third factor $L_3$ and to simultaneously reduce the aberration change due to the eccentricity.

The lower limit of Inequality (6) lies in the direction in which $R_l$ and $\phi_{12}$ have different signs and $R_l$ increases, that is, the direction in which the incidental angle of the Rand light upon the third factor $L_3$ becomes enlarged and the generation of aberration is enlarged. Therefore, if the value is lower than the lower limit shown in Inequality (6), the aberration of the Rand light tends to be enlarged. As a result, the aberration compensation by the vibration-insulating compensation optical system Gv cannot be satisfactorily conducted with the number of the lenses forming the third factor $L_3$ reduced simultaneously. If the value exceeds the upper limit shown in Inequality (6), the comatic aberration can be generated or astigmatism or comatic aberration can be generated when the eccentric state has been realized.

In the case where the third factor $L_3$ is formed by only one positive lens, the vibration-isolating compensating optical system Gv is formed by only three lenses. Assuming that the refractive index of the second factor $L_2$ and that of the third factor $L_3$ are respectively $N_2$ and $N_3$, and the abbe's number of the first factor $L_1$ and that of the second factor $L_2$ are respectively $v_1$ and $v_2$, it is preferable that the following relationship be held:

$$v_1 > 69, v_2 < 37 \quad (7)$$

$$N_2 > 1.75, N_3 > 1.71 \quad (8)$$

In order to compensate chromatic aberration, it is preferable that the first factor $L_1$ employs a low divergent glass and the second factor $L_2$ employs a high divergent glass since the vibration-isolating compensating optical system Gv can be simply structured by three sections. Specifically, since the power of the third factor $L_3$ is the main portion of the power of the overall body of the vibration-insulating compensating optical system Gv, the curvature radius of the lens of the third factor $L_3$ tends to be reduced. In order to reduce the higher aberration generated in the third factor $L_3$, it is preferable that the structure is formed by moderate curved surfaces with arranging the refraction index $N_3$ of the third factor $L_3$ to be 1.71 or more so as to meet the conditions shown in Inequality (8). However, if the refraction index of the positive lens serving as the third factor $L_3$ is raised, the Petzval's sum is made a large negative value. Therefore, it is preferable that the refraction index $N_2$ of the second factor $L_2$ be 1.75 or more, so that the Petzval's sum is compensated to a certain positive value.

In order to obtain further improved aberration, it is preferable that the combined power $\phi_{12}$ of the first factor $L_1$ and the second factor $L_2$ be a negative value, that is $\phi_{12} \leq 0$. Therefore, an excellent aberration balance can be established with the third factor $L_3$ formed only one positive lens by causing aberration to be generated as a negative lens system by the first factor $L_1$ and the second factor $L_2$ of the vibration-isolating compensating optical system Gv.

In the case where the third factor $L_3$ is formed by two lenses: a negative lens $L_{31}$ and a positive lens $L_{32}$, it is preferable that the negative lens be positioned adjacent to the object, while the positive lens be positioned adjacent to the image. The reason for this lies in that the characteristic of the spherical aberration of the structure formed by the first factor $L_1$ and the second factor $L_2$ to become a negative value is cancelled by the characteristic of the third factor $L_3$ to become a positive value in which the concave and the convex are arranged in this order, the structure formed by the first factor $L_1$ and the second factor $L_2$ being structured by arranging a convex and a concave in this order. In order to obtain further improved aberration, it is preferable that the negative lens $L_{31}$ in the third factor $L_3$ be a concave confronting the image and the positive lens $L_{32}$ in the third factor $L_3$ be a convex confronting the object. Thus, the upper comatic aberration which tends to become a negative value on the lens surface of the negative lens $L_{31}$ of the third factor $L_3$ adjacent to the image can be compensated toward the positive direction. Furthermore, the tendency of the aberration of the Rand light to become a positive value in this case is compensated by arranging the lens surface of the positive lens $L_{32}$ disposed next to be a convex confronting the object. When the negative lens $L_{31}$ and the positive lens $L_{32}$ of the third factor $L_3$ are laminated to each other, generation of asymmetric aberration due to the vibrations caused from the compensation of the eccentricity can be reduced. Therefore, the aberration change of the third factor $L_3$ due to the vibrations, that is, the eccentricity can be further reduced.

The compensation of image blurring by the vibration-insulating compensating optical system is applied to the overall image plane. Therefore, although the image blurring can be compensated at the central portion of the image plane by a single lens, the peripheral portion of the image blurring cannot be sufficiently compensated because aberration is generated due to the vibration-insulating compensation operation. Therefore, the vibration-insulating compensating optical system Gv must be formed by at least a positive lens and at least a negative lens so as to cause the aberration generated in the positive lens to be compensated by the negative lens.

In the case where the eccentricity of the vibration-insulating compensating optical system Gv at the time of compensating image blurring is realized by rotationally tilting the optical axis of the vibration-insulating compensating optical system Gv with respect to the coaxial optical axis of the vibration-insulating optical system, the center of rotation must be rotationally tilted relative to at least a point on the coaxial optical axis of the vibration-insulating optical system which is brought to a stationary state. If the center of rotation is positioned outside the coaxial optical axis of the vibration-insulating optical system, the locus of the movement of the vibration-insulating compensating optical system Gv for compensating image blurring can be made symmetric with respect to the optical axis. Therefore, the structure for the mechanical control becomes too complicated. In the structure in which the number of the center of rotation is arranged to be one, the vibration-insulating compensating optical system Gv describes only a circular locus which is symmetric with respect to the optical axis. However, when the structure is arranged in such a manner that the center of rotation can move to a plurality of points on the coaxial optical axis, design of the optical structure can be conducted further freely.

Assuming that the center of rotation of the vibration-insulating optical system on the coaxial optical axis is P, the distance from the rotation center P to the position of the rear principal point of the vibration insulating compensating optical system Gv is Lp, the overall length of the vibration-insulating compensating optical system Gv is l and the maximum vibration insulating compensated quantity on the image surface is $\Delta y$, it is preferable that the distance Lp meets the following relationship:

$$|Lp| > |\Delta y| \cdot l \quad (9)$$

If the position of the rotation center P, that is the distance from the rotation center P to the rear principal point of the vibration-insulating compensating optical system Gv deviates from the above-described relationship (9), the rotational tilting angle on the image plane with respect to the maximal vibration-insulating compensating quantity $\Delta y$ becomes too large. Because of an additional reason that the vibration-insulating compensating optical system Gv is formed in a thick structure, the optical path in the vibration-insulating optical system Gv changes significantly from the optical path in the state in which the vibration-insulating compensation has not been performed as yet. As a result, the more the view angle becomes, the more the aberration at the stationary state and the aberration at the time of vibration-insulating compensation excessively differ from each other. Therefore, it is preferable that the position of the rotation center P meets Inequality (9).

In particularly, in order to effectively perform the vibration-insulating compensation, it is preferable that the position of the rotation center P of the vibration-insulating compensating optical system Gv be positioned opposite to the rear principal point of the vibration-insulating compensating optical system Gv with respect to the middle point of the overall length of the vibration-insulating compensating optical system Gv. The reason for this lies in that the rear principle point of the vibration-insulating compensating optical system Gv with which the vibration-insulating compensation can be performed most effectively is necessary to be displaced by a relatively large degree. On the other hand, the displacement of the lens disposed away from the rear principal point must be made smaller. As a result, the vibration-insulating compensation can be performed only in a small space in the vertical direction with respect to the optical axis of the vibration-insulating optical system. Therefore, the shape of the mechanism for holding the lens and the arrangement of it can be freely determined when the overall structure of the optical system is designed.

In order to maintain a satisfactory aberration by a small size and light weight vibration-insulating compensating optical system Gv for performing the vibration-insulating compensation by rotational tilting of the optical axis, it is preferable that the structure be formed by a double convex lens, a negative meniscus lens whose concave faces the object and one or a plurality of positive lenses in sequence order from the portion adjacent to the object.

Then, preferred embodiments, in which the vibration-insulating compensating optical system according to the present invention is applied to so-called an inner focus telephoto lens, will be described with reference to the drawings. The structure of each of the embodiments is formed by arranging, in sequence order from the portion adjacent to the object, a first lens group $G_1$ having positive refractive power, a second lens group $G_2$ having negative refractive power and a third lens group having positive refractive power. The third lens group serves as the vibration-insulating compensating optical system Gv according to the present invention so as to be made eccentric with respect to the optical axis of the overall system. As a result, the deviation of the overall system or image blurring can be compensated. In the above-described structure, the fixed lens group GF forms a substantial afocal system by the first lens group $G_1$ having positive refractive power and the second lens group $G_2$ having negative refractive power. Its short range focusing can be realized by the movement of the second lens group $G_2$ having negative refractive power along the optical axis.

FIGS. 1, 2, 3, 4 and 5 illustrate the structures of the lens according to the embodiments of the present invention.

According to each of the embodiments, the first lens group $G_1$ having positive refractive power comprises, in sequence order from the portion adjacent to the object, two positive lenses $L_{11}$ and $L_{12}$ whose stronger surface confronts the object, double concave negative lens $L_{13}$ and laminated meniscus lens disposed with a relatively wide air layer interposed and consisting of a negative meniscus lens $L_{14}$ and a positive meniscus lens $L_{15}$. The second lens group $G_2$ having negative refractive power comprises, in sequence order from the portion adjacent to the object, a negative lens formed by laminating a double convex lens $L_{21}$ and a double concave lens $L_{22}$, and a double concave negative lens $L_{23}$. A parallel flat plate F disposed in the vibration-insulating compensating optical system Gv adjacent to the image is a filter acting to permit only light having a predetermined wavelength band to pass through and also acting to prevent invasion of dust from the rear direction to the lens due to the vibrations of the vibration-insulating compensating optical system.

Then, the embodiments will be respectively described.

First Embodiment

The first embodiment according to the present invention and shown in FIG. 1 comprises, as described above, the vibration-insulating compensating optical system Gv formed by three lens factors $L_1$, $L_2$ and $L_3$, in order from a position adjacent to the fixed lens group GF toward the image. Specifically, the third factor $L_3$ is formed by a single positive meniscus lens whose concave faces the object. Image blurring due to variations of the overall body of the optical system is compensated by making the three factors integrally eccentric with respect to the optical axis with the parallel relationship maintained. That is, the vibration-insulating compensating optical system Gv compensates image blurring by its eccentric movement performed in such a manner that an image, which tends to move vertically with respect to the optical axis due to the vibrations of the overall body of the optical system, is shifted in the inverse direction. The principle of this action has been disclosed in detail in Japanese Patent Publication No. 41-8558. The quantity of compensation according to this embodiment is 1 mm and the quantity of eccentricity of the vibration-insulating compensating optical system Gv required to perform the compensation is also 1 mm. The details of the first embodiment is shown in Table 1.

Figure 1A:
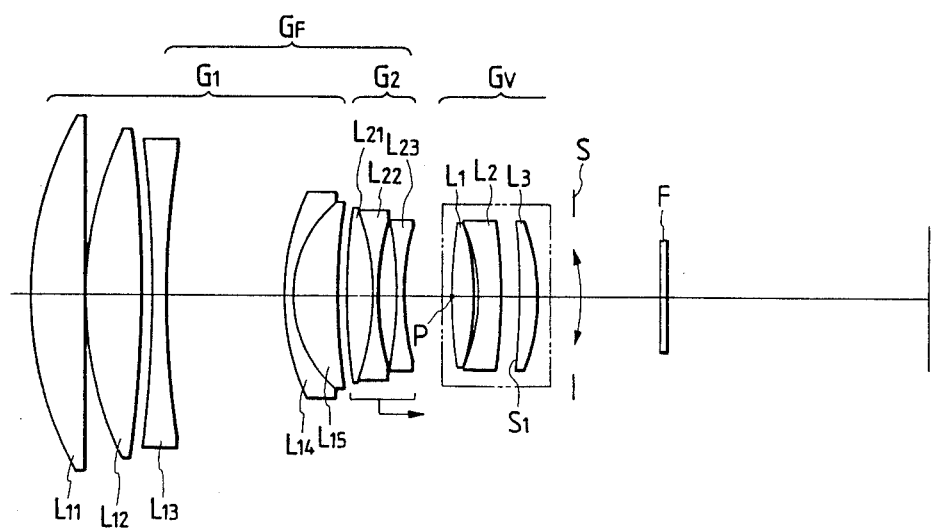
FIG. 1A illustrates a case according to the first embodiment shown in FIG. 1 in which a vibration-isolating compensating optical system is tilted and made eccentric with respect to the optical system.

According to the first embodiment, vibration insulation can be achieved by making the vibration-insulating compensating optical system Gv eccentric in such a manner that it is rotated by a small angle so as to change the inclination with respect to the optical axis as an alternative to making the vibration-insulating compensating optical system Gv eccentric with the parallel relationship maintained. That is, as shown in FIG. 1A, image blurring due to the variations of the overall body of the optical system can be compensated by tilting, by a small angle, the overall body of the vibration-insulating compensating optical system Gv relative to point P on the optical axis. Image blurring due to the vertical movement of an image with respect to the optical axis due to the vibrations of the overall body of the optical system is compensated by the eccentric movement in which the vibration-insulating compensating optical system Gv is tilted.

As shown in FIG. 1A, image blurring by 0.5 mm on the image plane can be compensated by arranging the position of the rotation center P of the vibration-insulating compensating optical system Gv to be the apex of the lens surface of the vibration-insulating compensating optical system Gv which is nearest to the object and by tilting the optical axis of the vibration-insulating compensating optical system Gv by 1.125° with respect to the optical axis of the overall body of the optical system.

It is preferable to obtain a further improved compensation effect that the position of the rotation center P of the vibration-insulating compensating optical system Gv be determined at a position relatively away from the diaphragm S than the central position of the vibration-insulating compensating optical system Gv. The position of the rotation center P of the vibration-insulating compensating optical system Gv may be determined outside the vibration-insulating compensating optical system Gv as an alternative to the inner portion of the same.

Second Embodiment

Figure 2:
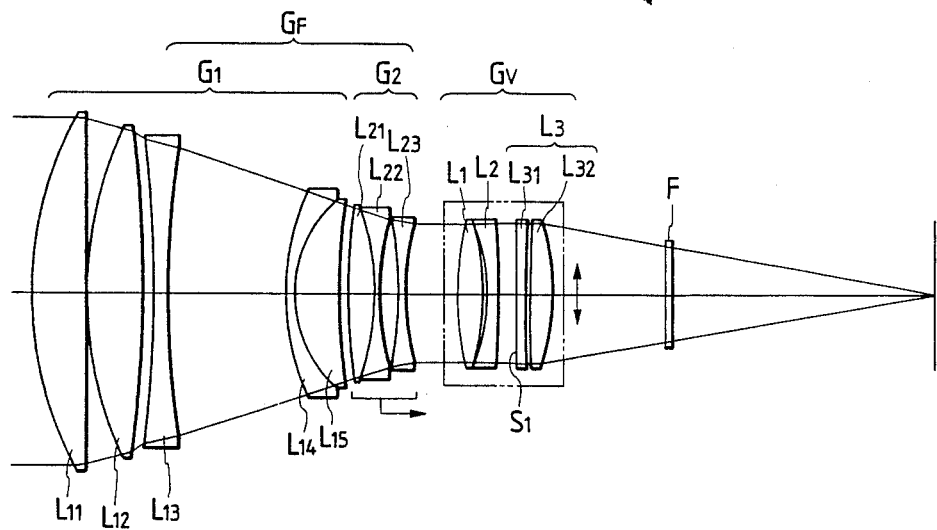
FIG. 2 is a structural view which illustrates a second embodiment of an optical system according to the present invention.

As shown in FIG. 2, the second embodiment structured in such a manner that the third factor $L_3$ of the vibration-insulating compensating optical system Gv is constituted by two elements that is, in sequence order from the portion adjacent to the object, a negative meniscus lens $L_{31}$ whose convex faces the object and a double convex positive lens $L_{32}$ positioned away from each other. The details of the second embodiment are shown in Table 2.

Third Embodiment

Figure 3:
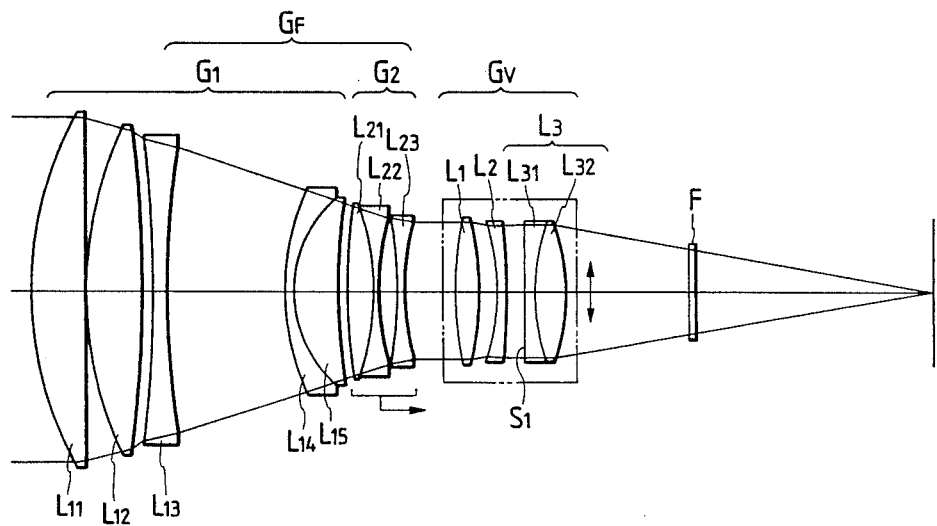
FIG. 3 is a structural view which illustrates a third embodiment of an optical system according to the present invention.

As shown in FIG. 3, the structure according to the third embodiment is formed in such a manner that the third factor $L_3$ is constituted by laminating the negative meniscus lens $L_{31}$ whose convex faces the object and double convex positive lens $L_{32}$. As a result of the structure in which the two elements forming the third factor $L_3$ are laminated to each other, the supporting can be easily conducted and the durability against vibrations can be improved. The details of the third embodiment are shown in Table 3.

Fourth Embodiment

Figure 4:
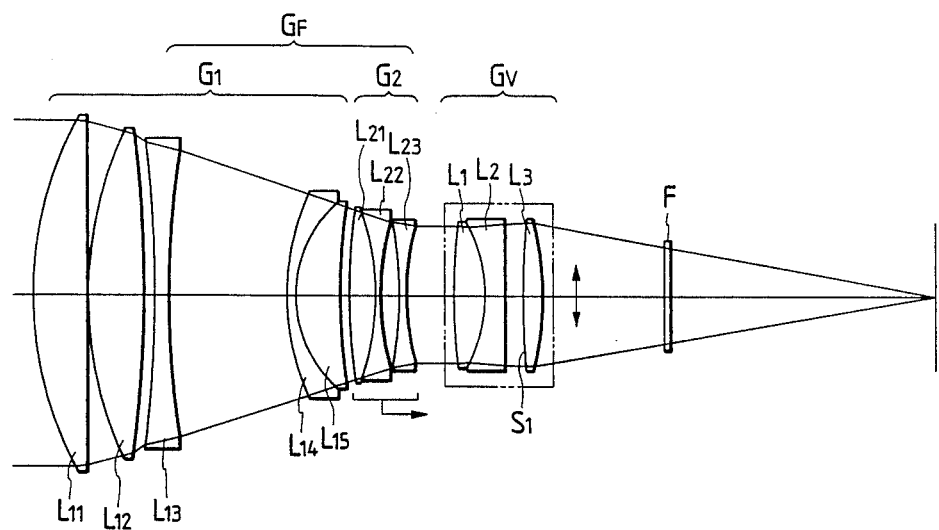
FIG. 4 is a structural view which illustrates a first embodiment of an optical system according to the present invention.

As shown in FIG. 4, the structure according to the fourth embodiment is formed by laminating the first factor $L_1$ of the vibration-insulating compensating optical system Gv and the second factor $L_2$ of the same are laminated to each other. The structure according to this embodiment exhibits the most simple structure but exhibits a further durability against vibrations. The details of the fourth embodiment are shown in Table 4.

Fifth Embodiment

Figure 5:
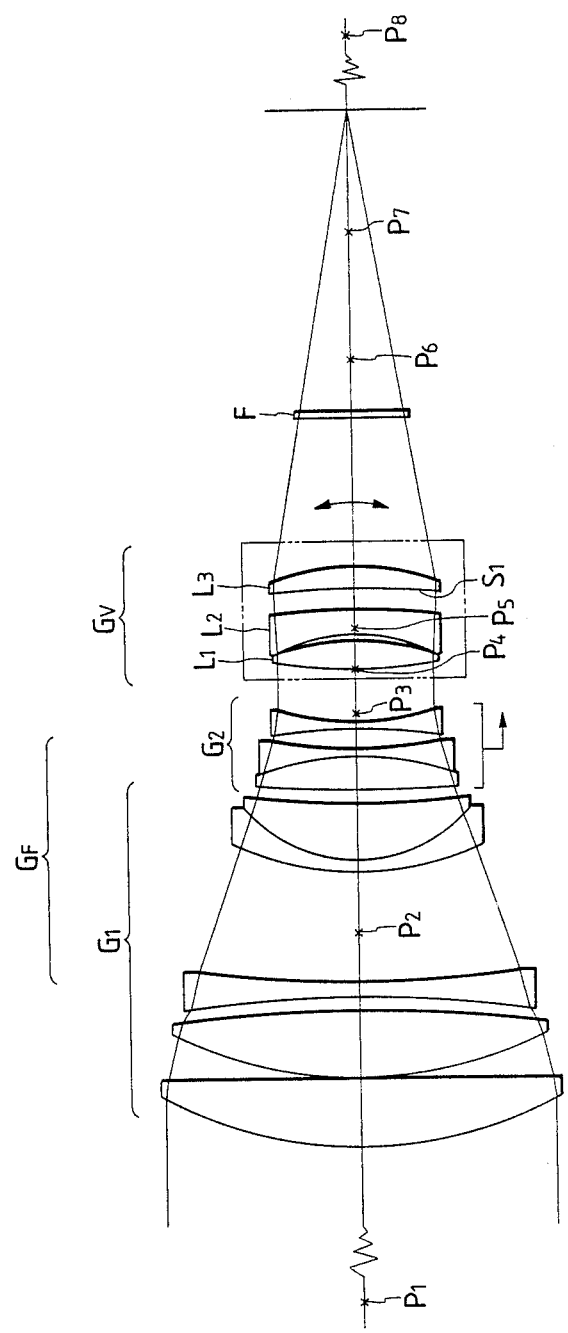
FIG. 5 is a structural view which illustrates various centers of rotation according to a fifth embodiment of the present invention arranged in such a manner that the vibration isolation is realized by tilting the rotation of the vibration-isolating compensating optical system.

As shown in FIG. 5, the structure according to the fifth embodiment of the present invention is, similarly to the vibration-insulating optical system according to the first embodiment as shown in FIG. 1A, arranged to perform the vibration-insulating compensation by rotationally tilting the position of the rotation center P of the vibration-insulating compensating optical system Gv as the apex $P_4$ of the surface of the lens of the vibration-insulating compensating optical system Gv which is the nearest to the object. Also according to the fifth embodiment, image blurring of 0.5 mm on the image plane can be compensated by tilting the optical axis of the vibration-insulating compensating optical system Gv by 1.125° with respect to the optical axis of the overall body of the optical axis.

The details of the fifth embodiment are shown in Table 5. Table 6 shows the position of each of the rotational centers and the maximal rotational angles at the rotational centers when it is assumed that an optional position of the rotational center on the optical axis of the overall body of the optical system with which the maximal image blurring compensation quantity $\Delta y$ on the image plane becomes 0.5 mm is Pn (where n=1 to 8). According to the above-described embodiments, although only the fixed filter having no power is provided in the portion of the vibration-insulating compensating optical system Gv adjacent to the image, a lens group substantially having refractive power may be provided in the above-described portion. As the lens group GF disposed more adjacently to the object than the vibration-insulating compensating optical system Gv, either lens group having a positive refractive power or that having a negative refractive power may be employed. It is preferable, as described above, that it may be a substantial afocal system having weak refractive power. Furthermore, not only the above-described first embodiment, but also the other embodiments, of course, is able to perform the compensation by the rotational tilting of the vibration-insulating compensating optical system Gv.

The details of each of the embodiments are shown in Tables 1 to 5, where symbol r represents the curvature radius of each of the lens surfaces, symbol d represents the interval between lens surfaces, symbols Abbe and symbol n respectively represent the Abbe's number and the refractive index with respect to the line d ($\lambda = 487.6$ nm), numeral positioned at the left ends represent the order from the object, symbol f represents the focal distance of the overall body of the system, symbol FNO represents the F-number and symbol $2\omega$ represents the field angle.

TABLE 1

(First embodiment)
$f = 297.0$ FNo $= 2.8$ $2\omega = 8.3°$

| | r | d | Abbe | n |
|---|---|---|---|---|
| 1 | 109.927 | 15.60 | 82.6 | 1.49782 |
| 2 | 13476.664 | .30 | | |
| 3 | 114.120 | 16.50 | 82.6 | 1.49782 |
| 4 | −473.430 | 3.70 | | |
| 5 | −370.500 | 4.50 | 35.2 | 1.74950 |
| 6 | 307.534 | 35.98 | | |
| 7 | 83.463 | 2.30 | 53.9 | 1.71300 |
| 8 | 37.445 | 12.90 | 69.9 | 1.51860 |
| 9 | 179.291 | 3.01 | | |
| 10 | 221.841 | 7.60 | 33.9 | 1.80384 |
| 11 | −81.907 | 1.90 | 60.7 | 1.60311 |
| 12 | 89.196 | 5.40 | | |
| 13 | −140.000 | 1.90 | 52.3 | 1.74810 |
| 14 | 70.483 | 14.84 | | |
| 15 | 135.437 | 6.90 | 82.6 | 1.49782 |
| 16 | −72.013 | 1.60 | | |
| 17 | −51.654 | 6.50 | 28.6 | 1.79504 |
| 18 | −207.775 | 5.50 | | |
| 19 | −336.248 | 5.60 | 31.6 | 1.75692 |
| 20 | −66.780 | 38.35 | | |
| 21 | ∞ | 2.00 | 64.1 | 1.51680 |
| 22 | ∞ | Bf = 78.50 | | |

TABLE 2

(Second Embodiment)
$f = 297.0$ FNo $= 2.8$ $2\omega = 8.3°$

| | r | d | Abbe | n |
|---|---|---|---|---|
| 1 | 118.435 | 12.80 | 82.6 | 1.49782 |
| 2 | 943.895 | .30 | | |
| 3 | 110.718 | 16.80 | 82.6 | 1.49782 |
| 4 | −478.068 | 3.70 | | |
| 5 | −401.348 | 4.50 | 28.3 | 1.72825 |
| 6 | 404.516 | 39.09 | | |
| 7 | 81.287 | 2.30 | 51.1 | 1.73350 |
| 8 | 37.600 | 12.90 | 64.1 | 1.51680 |
| 9 | 184.094 | 2.94 | | |
| 10 | 225.947 | 7.10 | 25.4 | 1.80518 |
| 11 | −90.000 | 1.90 | 54.6 | 1.51454 |
| 12 | 83.993 | 5.40 | | |
| 13 | −126.890 | 1.90 | 45.4 | 1.79668 |
| 14 | 71.318 | 15.17 | | |
| 15 | 120.509 | 6.90 | 82.6 | 1.49782 |
| 16 | −83.026 | 1.70 | | |
| 17 | −55.175 | 3.50 | 38.8 | 1.67163 |
| 18 | −360.867 | 5.50 | | |
| 19 | 90000.000 | 3.00 | 45.0 | 1.74400 |
| 20 | 228.368 | 1.00 | | |
| 21 | 262.612 | 7.00 | 50.8 | 1.65844 |
| 22 | −70.796 | 35.21 | | |
| 23 | ∞ | 2.00 | 64.1 | 1.51680 |
| 24 | ∞ | Bf = 78.99 | | |

TABLE 3

(Third Embodiment)
$f = 297.0$ FNo $= 2.8$ $2\omega = 8.3°$

| | r | d | Abbe | n |
|---|---|---|---|---|
| 1 | 110.846 | 15.60 | 82.6 | 1.49782 |
| 2 | 6000.000 | .30 | | |
| 3 | 117.512 | 16.50 | 82.6 | 1.49782 |
| 4 | −437.495 | 3.70 | | |
| 5 | −351.000 | 4.50 | 35.2 | 1.74950 |

TABLE 3-continued (Third Embodiment)

f = 297.0 FNo = 2.8 2ω = 8.3°

|   | r | d | Abbe | n |
|---|---|---|---|---|
| 6 | 348.474 | 36.13 | | |
| 7 | 105.163 | 2.30 | 53.9 | 1.71300 |
| 8 | 35.896 | 14.40 | 67.9 | 1.59319 |
| 9 | 200.588 | 3.01 | | |
| 10 | 224.264 | 7.60 | 33.9 | 1.80384 |
| 11 | −81.000 | 1.90 | 58.5 | 1.61272 |
| 12 | 91.256 | 5.40 | | |
| 13 | −141.300 | 1.90 | 52.3 | 1.74810 |
| 14 | 70.821 | 14.85 | | |
| 15 | 103.002 | 6.90 | 82.6 | 1.49782 |
| 16 | −108.000 | 5.60 | | |
| 17 | −60.197 | 3.00 | 32.2 | 1.67270 |
| 18 | −413.521 | 5.50 | | |
| 19 | 1607.481 | 3.50 | 45.0 | 1.74400 |
| 20 | 60.000 | 9.20 | 42.0 | 1.66755 |
| 21 | −71.253 | 38.35 | | |
| 22 | ∞ | 2.00 | 64.1 | 1.51680 |
| 23 | ∞ | Bf = 70.06 | | |

TABLE 4

(Fourth Embodiment)

f = 297.0 FNo = 2.8 2ω = 8.3°

|   | r | d | Abbe | n |
|---|---|---|---|---|
| 1 | 114.835 | 17.60 | 82.6 | 1.49782 |
| 2 | 2387.746 | .30 | | |
| 3 | 105.979 | 18.10 | 82.6 | 1.49782 |
| 4 | −393.398 | 3.50 | | |
| 5 | −328.200 | 4.70 | 35.2 | 1.74950 |
| 6 | 386.924 | 30.50 | | |
| 7 | 83.383 | 2.20 | 55.6 | 1.69680 |
| 8 | 38.417 | 15.00 | 70.4 | 1.48749 |
| 9 | 203.746 | 2.52 | | |
| 10 | 412.244 | 8.40 | 33.9 | 1.80384 |
| 11 | −81.738 | 2.00 | 60.7 | 1.60311 |
| 12 | 94.919 | 5.10 | | |
| 13 | −190.000 | 2.00 | 52.3 | 1.74809 |
| 14 | 65.477 | 14.10 | | |
| 15 | 172.821 | 9.50 | 82.6 | 1.49782 |
| 16 | −43.803 | 6.50 | 33.9 | 1.80384 |
| 17 | −498.867 | 5.50 | | |
| 18 | 425.192 | 5.60 | 31.6 | 1.75692 |
| 19 | −85.107 | 37.70 | | |
| 20 | ∞ | 2.00 | 64.1 | 1.51680 |
| 21 | ∞ | Bf = 80.97 | | |

TABLE 5

(Fifth Embodiment)

f = 297.0 FNo = 2.8 2ω = 8.3°

|   | r | d | Abbe | n |
|---|---|---|---|---|
| 1 | 112.780 | 17.60 | 82.6 | 1.49782 |
| 2 | 2634.455 | .30 | | |
| 3 | 108.261 | 18.10 | 82.6 | 1.49782 |
| 4 | −397.703 | 3.50 | | |
| 5 | −332.243 | 4.70 | 35.2 | 1.74950 |
| 6 | 383.650 | 28.87 | | |
| 7 | 84.625 | 2.20 | 55.6 | 1.69680 |
| 8 | 38.764 | 15.00 | 70.4 | 1.48749 |
| 9 | 210.869 | 4.00 | | |
| 10 | 471.818 | 8.40 | 33.9 | 1.80384 |
| 11 | −78.537 | 2.00 | 60.7 | 1.60311 |
| 12 | 98.621 | 5.10 | | |
| 13 | −159.458 | 2.00 | 52.3 | 1.74810 |
| 14 | 69.682 | 13.90 | | |
| 15 | 146.361 | 6.90 | 69.9 | 1.51860 |
| 16 | −69.719 | 1.60 | | |
| 17 | −50.689 | 6.50 | 25.4 | 1.80518 |
| 18 | −200.551 | 5.50 | | |
| 19 | −295.108 | 5.60 | 28.2 | 1.74000 |
| 20 | −64.433 | 39.20 | | |
| 21 | ∞ | 2.00 | 64.1 | 1.51680 |
| 22 | ∞ | Bf = 77.67 | | |

TABLE 6

| Pn | Positions of Rotation Center Pn (mm) | Maximal Rotary Angle (degree) |
|---|---|---|
| $P_1$ | −200.0 | ±0.127 |
| $P_2$ | −50.0 | ±0.380 |
| $P_3$ | −10.0 | ±0.807 |
| $P_4$ | 0.0 | ±1.125 |
| $P_5$ | +8.5 | ±1.642 |
| $P_6$ | +76.1 | ±0.566 |
| $P_7$ | +126.1 | ±0.285 |
| $P_8$ | +1026.1 | ±0.285 |

As is shown from the above-described tables, according to each of the above-described embodiments, the reduction in the aberration change due to the eccentricity compensation and the shortening of the overall length of the vibration-insulating compensating optical system Gv can be realized simultaneously such that:

26.1 mm according to the first embodiment
28.6 mm according to the second embodiment
33.7 mm according to the third embodiment
27.1 mm according to the fourth embodiment
26.1 mm according to the fifth embodiment All of the above-described embodiments are able to meet the conditions of the present invention. Table 7 shows data corresponding to each of the conditions.

TABLE 7

(Data Corresponding to the Conditions)

| Conditions for Present Invention | Embodiments | | | | |
|---|---|---|---|---|---|
| | 1 | 2 | 3 | 4 | 5 |
| (1) $\phi_{12}/\phi$ | $-7.6 \times 10^{-2}$ | $6.0 \times 10^{-2}$ | $9.5 \times 10^{-3}$ | $-2.8 \times 10^{-1}$ | $-6.5 \times 10^{-2}$ |
| (2) $\dfrac{\phi}{\phi_2} + 1$ | 0.262 | 0.117 | 0.183 | 0.493 | 0.277 |
| (3) $\dfrac{\phi_2}{\phi_1} + 1$ | −0.09 | −0.02 | −0.03 | −0.18 | −0.07 |
| (4) $\phi \cdot D_2$ | $4.6 \times 10^{-2}$ | $4.6 \times 10^{-2}$ | $4.6 \times 10^{-2}$ | $4.6 \times 10^{-2}$ | $5.5 \times 10^{-2}$ |
| (5) $q_2$ | 1.66 | 1.34 | 1.36 | 1.19 | 1.68 |
| (6) $\phi_{12}/R1$ | $1.91 \times 10^{-6}$ | $3.15 \times 10^{-7}$ | $8.86 \times 10^{-10}$ | $-5.57 \times 10^{-6}$ | $1.85 \times 10^{-6}$ |

Figure 6:
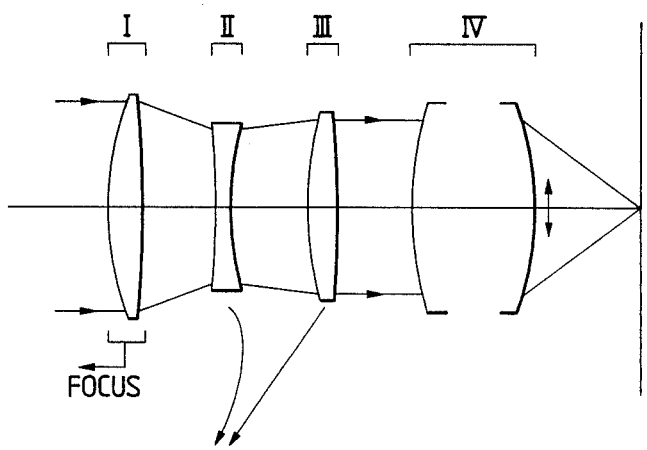
FIG. 6 is a structural view which schematically illustrates the optical system of the zoom lens which includes the vibration-isolating compensating optical system serving as an essential portion of the present invention.

According to the embodiments of the present invention, the lens group GF of the vibration-insulating compensating optical system Gv adjacent to the object comprises the first lens group $G_1$ of so-called an inner focus telephoto lens and having positive refractive power and the second lens group $G_2$ serving as the focusing group and movable along the optical axis. However, the present invention is not limited to the above-described group structure. A zoom lens may be structured by the overall body of the vibration-insulating photographing optical system in such a manner that a magnification system movable on the optical axis is employed. For example, as shown in FIG. 6, the vibration-insulating compensating optical system Gv according to the present invention may be disposed in the positive lens group IV serving as the relay system of so-called a four-group afocal zoom lens structured by, in sequence order from the portion adjacent to the object, a positive, a negative, a positive and a positive group. Furthermore, a magnification system formed by three groups consisting of a positive first lens group I, a negative second lens group II and a positive third lens group III may be provided in the forward fixed lens group GF. According to the vibration-insulating zoom lens shown in FIG. 6, the positive first lens group I is arranged to be moved along the optical axis so as to perform the focusing and the second lens group II and the third lens group III are relatively moved so as to perform the zooming. The portion between the third lens group III and the fourth lens group IV is arranged to cause the Rand light to run substantially parallel.

Although the invention has been described in its preferred form with a certain degree of particularly, it is understood that the present disclosure of the preferred from has been changed in the details of construction and the combination and arrangement of parts may be resorted to without departing from the spirit and the scope of the invention as hereinafter claimed.

WHAT IS CLAIMED IS:

1. A vibration-isolating optical system having an image stabilizing function, comprising:
   a fixed lens optical system having a plurality of lens groups which are arranged to be stationary in the vertical direction with respect to the optical axis; and
   a vibration-isolating compensating optical system disposed adjacently to the image of said fixed lens optical system and arranged to be movable in a direction intersecting said optical axis, wherein said vibration-isolating compensating optical system is constituted by, in sequence order from the portion adjacent to the object, a first factor formed by a double convex positive lens, a second factor formed by a negative lens whose concave confronts the object and a third factor formed by a positive lens, said vibration-isolating compensating optical system being arranged so as to meet the following relationships, assuming that the power (the reciprocal of the focal length) of the overall body of said vibration-isolating compensating optical system is $\phi$, the power of said first factor is $\phi_1$, the power of said second factor is $\phi_2$ and the combination power of said first factor and said second factor is $\phi_{12}$:

$$|\phi_{12}| \leq 0.3\phi$$

$$-0.5 \leq \frac{\phi}{\phi_2} + 1 \leq 1.0$$

$$-0.3 \leq \frac{\phi_2}{\phi_1} + 1 \leq 0.3$$

2. A vibration-isolating optical system according to claim 1, wherein said second factor and said third factor are positioned so as to meet the following relationship, assuming that the width of an air layer positioned between said second factor and said third factor is $D_2$:

$$0 \leq \phi \cdot D_2 \leq 0.1$$

3. A vibration-isolating optical system according to claim 1, wherein, assuming that the form factor of said second factor is $q_2$, said second factor is constituted so as to meet the following relationship:

$$0.6 < q_2 < 6$$

where said form factor q of the lens factor is expressed as follows:

$$q = (rb+ra)/(rb-ra)$$

where
   ra: the curvature radius of the surface of said lens factor confronting the object
   rb: the curvature radius of the surface of said lens factor confronting the image.

4. A vibration-isolating optical system according to claim 1, wherein said vibration-isolating compensating optical system is constituted so as to further meet the following relationship, assuming that the curvature radius of the surface of said third component which is nearest to the object is $R_l$:

$$-5.6 \times 10^6 < \frac{\phi_{12}}{R1} < 1.5 \times 10^5$$

5. A vibration-isolating optical system according to claim 1, said vibration-isolating compensating optical system is constituted so as to meet the following relationship, assuming that said third factor comprises a single positive lens, the Abbe's number of said first factor and said second factor are $\nu_1$ and $\nu_2$ respectively and the refractive index of said second factor and said third factor are $N_2$ and $N_3$, respectively:

$$\nu_1 > 60, \nu_2 < 37$$

$$N_2 > 1.75, N_3 > 1.71$$

6. A vibration-isolating optical system according to claim 5, wherein said first factor and said second factor are constituted so as to further meet the following relationship:

$$\phi_{12} \leq 0$$

7. A vibration-isolating optical system according to claim 1, wherein said third factor is constituted by, in sequence order from the portion adjacent to the object, a negative lens whose surface confronting the image is concave and a positive lens whose surface confronting the object is convex.

8. A vibration-isolating optical system according to claim 1, wherein said fixed lens optical system of said vibration-isolating compensating optical system disposed adjacent to the object includes a lens group having a positive refracting power and a lens group having a negative refracting power, the overall body of said fixed lens optical system being constituted to be an afocal optical system.

9. A vibration-isolating optical system according to claim 1, wherein said fixed lens optical system of said vibration-isolating compensating optical system disposed adjacent to the object is constituted to be a substantially afocal power-variable system including, in sequence order from the portion adjacent to the object, a positive first-lens group, a negative second-lens group capable of moving along the optical axis for the purpose of performing zooming and a positive third-lens group and said vibration-isolating compensating optical system forms, together with said fixed lens optical system, a part of a zoom lens formed by four groups: a positive, a negative, a positive and a positive lens groups.

10. A vibration-isolating optical system according to claim 1 constituted in accordance with data shown in the following:

| | f = 297.0 FNo = 2.8 2ω = 8.3° | | | |
|---|---|---|---|---|
| | r | d | Abbe | n |
| 1 | 109.927 | 15.60 | 82.6 | 1.49782 |
| 2 | 13476.664 | .30 | | |
| 3 | 114.120 | 16.50 | 82.6 | 1.49782 |
| 4 | −473.430 | 3.70 | | |
| 5 | −370.500 | 4.50 | 35.2 | 1.74950 |
| 6 | 307.534 | 35.98 | | |
| 7 | 83.463 | 2.30 | 53.9 | 1.71300 |
| 8 | 37.445 | 12.90 | 69.9 | 1.51860 |
| 9 | 179.291 | 3.01 | | |
| 10 | 221.841 | 7.60 | 33.9 | 1.80384 |
| 11 | −81.907 | 1.90 | 60.7 | 1.60311 |
| 12 | 89.196 | 5.40 | | |
| 13 | −140.000 | 1.90 | 52.3 | 1.74810 |
| 14 | 70.483 | 14.84 | | |
| 15 | 135.437 | 6.90 | 82.6 | 1.49782 |
| 16 | −72.013 | 1.60 | | |
| 17 | −51.654 | 6.50 | 28.6 | 1.79504 |
| 18 | −207.775 | 5.50 | | |
| 19 | 336.248 | 5.60 | 31.6 | 1.75692 |
| 20 | −66.780 | 38.35 | | |
| 21 | ∞ | 2.00 | 64.1 | 1.51680 |
| 22 | ∞ | Bf = 78.50 | | | where symbol r represents the curvature radius of each cf the lens surfaces, symbol d represents the interval between lens surfaces, symbols Abbe and symbol n respectively represent the Abbe's number and the refractive index with respect to the line d ($\lambda=487.6$ nm), numeral positioned at the left ends represent the order from the object, symbol f represents the focal distance of the overall body of the system, symbol FNO represents the F-number and symbol 2ω represents the field angle.

11. A vibration-isolating optical system according to claim 1 constituted in accordance with data shown in the following:

| | f = 297.0 FNo = 2.8 2ω = 8.3° | | | |
|---|---|---|---|---|
| | r | d | Abbe | n |
| 1 | 118.435 | 12.80 | 82.6 | 1.49782 |
| 2 | 943.895 | .30 | | |
| 3 | 110.718 | 16.80 | 82.6 | 1.49782 |
| 4 | −478.068 | 3.70 | | |
| 5 | −401.348 | 4.50 | 28.3 | 1.72825 |
| 6 | 404.516 | 39.09 | | |
| 7 | 81.287 | 2.30 | 51.1 | 1.73350 |
| 8 | 37.600 | 12.90 | 64.1 | 1.51680 |
| 9 | 184.094 | 2.94 | | |
| 10 | 225.947 | 7.10 | 25.4 | 1.80518 |
| 11 | −90.000 | 1.90 | 54.6 | 1.51454 |
| 12 | 83.993 | 5.40 | | |
| 13 | −126.890 | 1.90 | 45.4 | 1.79668 |
| 14 | 71.318 | 15.17 | | |
| 15 | 120.509 | 6.90 | 82.6 | 1.49782 |
| 16 | −83.026 | 1.70 | | |
| 17 | −55.175 | 3.50 | 38.8 | 1.67163 |
| 18 | −360.867 | 5.50 | | |
| 19 | 90000.000 | 3.00 | 45.0 | 1.74400 |
| 20 | 228.368 | 1.00 | | |
| 21 | 262.612 | 7.00 | 50.8 | 1.65844 |
| 22 | −70.796 | 35.21 | | |
| 23 | ∞ | 2.00 | 64.1 | 1.51680 |
| 24 | ∞ | Bf = 78.99 | | | where symbol r represents the curvature radius of each of the lens surfaces, symbol d represents the interval between lens surfaces, symbols Abbe and symbol n respectively represent the Abbe's number and the refractive index with respect to the line d ($\lambda=487.6$ nm), numeral positioned at the left ends represent the order from the object, symbol f represents the focal distance of the overall body of the system, symbol FNO represents the F-number and symbol 2ω represents the field angle.

12. A vibration-isolating optical system according to claim 1 constituted in accordance with data shown in the following:

| | f = 297.0 FNo = 2.8 2ω = 8.3° | | | |
|---|---|---|---|---|
| | r | d | Abbe | n |
| 1 | 110.846 | 15.60 | 82.6 | 1.49782 |
| 2 | 6000.000 | .30 | | |
| 3 | 117.512 | 16.50 | 82.6 | 1.49782 |
| 4 | −437.495 | 3.70 | | |
| 5 | −351.000 | 4.50 | 35.2 | 1.74950 |
| 6 | 348.474 | 36.13 | | |
| 7 | 105.163 | 2.30 | 53.9 | 1.71300 |
| 8 | 35.896 | 14.40 | 67.9 | 1.59319 |
| 9 | 200.588 | 3.01 | | |
| 10 | 224.264 | 7.60 | 33.9 | 1.80384 |
| 11 | −81.000 | 1.90 | 58.5 | 1.61272 |
| 12 | 91.256 | 5.40 | | |
| 13 | −141.300 | 1.90 | 52.3 | 1.74810 |
| 14 | 70.821 | 14.85 | | |
| 15 | 103.002 | 6.90 | 82.6 | 1.49782 |
| 16 | −108.000 | 5.60 | | |
| 17 | −60.197 | 3.00 | 32.2 | 1.67270 |
| 18 | −413.521 | 5.50 | | |
| 19 | 1607.481 | 3.50 | 45.0 | 1.74400 |
| 20 | 60.000 | 9.20 | 42.0 | 1.66755 |
| 21 | −71.253 | 38.35 | | |
| 22 | ∞ | 2.00 | 64.1 | 1.51680 |
| 23 | ∞ | Bf = 70.06 | | | where symbol r represents the curvature radius of each of the lens surfaces, symbol d represents the interval between lens surfaces, symbols Abbe and symbol n respectively represent the Abbe's number and the refractive index with respect to the line d ($\lambda=487.6$ nm), numeral positioned at the left ends represent the order from the object, symbol f represents the focal distance of the overall body of the system, symbol FNO represents the F-number and symbol 2ω represents the field angle.

13. A vibration-isolating optical system according to claim 1 constituted in accordance with data shown in the following:

| | f = 297.0 FNo = 2.8 2ω = 8.3° | | | |
|---|---|---|---|---|
| | r | d | Abbe | n |
| 1 | 114.835 | 17.60 | 82.6 | 1.49782 |
| 2 | 2387.746 | .30 | | |
| 3 | 105.979 | 18.10 | 82.6 | 1.49782 |
| 4 | −393.398 | 3.50 | | |
| 5 | −328.200 | 4.70 | 35.2 | 1.74950 |
| 6 | 386.924 | 30.50 | | |
| 7 | 83.383 | 2.20 | 55.6 | 1.69680 |
| 8 | 38.417 | 15.00 | 70.4 | 1.48749 |
| 9 | 203.746 | 2.52 | | |
| 10 | 412.244 | 8.40 | 33.9 | 1.80384 |
| 11 | −81.738 | 2.00 | 60.7 | 1.60311 |
| 12 | 94.919 | 5.10 | | |
| 13 | −190.000 | 2.00 | 52.3 | 1.74809 |
| 14 | 65.477 | 14.10 | | |
| 15 | 172.821 | 9.50 | 82.6 | 1.49782 |
| 16 | −43.803 | 6.50 | 33.9 | 1.80384 |
| 17 | −498.867 | 5.50 | | |
| 18 | 425.192 | 5.60 | 31.6 | 1.75692 |
| 19 | −85.107 | 37.70 | | |
| 20 | ∞ | 2.00 | 64.1 | 1.51680 |
| 21 | ∞ | Bf = 80.97 | | | where symbol r represents the curvature radius of each of the lens surfaces, symbol d represents the interval between lens surfaces, symbols Abbe and symbol n respectively represent the Abbe's number and the refractive index with respect to the line d ($\lambda = 487.6$ nm), numeral positioned at the left ends represent the order from the object, symbol f represents the focal distance of the overall body of the system, symbol FNO represents the F-number and symbol $2\omega$ represents the field angle.

14. A vibration-isolating optical system having an image stabilizing function, comprising:

a fixed lens optical system having a plurality of lens groups which are arranged to be stationary in the vertical direction with respect to the optical axis; and a vibration-isolating compensating optical system disposed adjacently to the image of said fixed lens optical system and arranged to be movable in a direction intersecting said optical axis relative to the center of rotation determined to be at least a point on said optical axis, wherein said vibration isolating optical system is constituted so as to meet the following relationship, assuming that the overall length from the surface of said lens of said vibration-insulating compensating optical system which is nearest to the object to the surface of said lens which is nearest to the image is l, the distance from said center of rotation of said vibration-insulating compensating optical system to the position of the rear principal point of said vibration insulating compensating optical system is Lp and the maximum vibration insulating compensated quantity on the image surface is $\Delta y$:

$$|Lp| > |\Delta y| \cdot l$$

15. A vibration insulating optical system according to claim 14, wherein said vibration isolating compensating optical system is constituted so as to be rotationally displaced in a plane centering an optional point on said optical axis opposing to said rear principal point of said vibrating insulating compensating optical system and including the optical axis with respect to the central position of the overall length of said vibration-insulating compensating optical system.

16. A vibration insulating optical system according to claim 14, wherein said vibration insulating compensating optical system is constituted by, in sequence order from the portion adjacent to the object, a first factor formed by a double convex positive lens, a second factor formed by a negative lens whose concave confronts the object and a third factor including at least a positive lens factor.

17. A vibration insulating optical system according to claim 16, wherein said vibration insulating compensating optical system is constituted so as to meet the following relationship, assuming that the power (the reciprocal of the focal length) of the overall body of said vibration-isolating compensating optical system is $\phi$ and the combination of the power of said first factor and said second factor is $\phi_{12}$:

$$|\phi_{12}| \leq 0.3 \phi, \phi_{12} \leq 0$$

18. A vibration-insulating optical system according to claim 14 constituted in accordances with data shown in the following:

| | f = 297.0 FNo = 2.8 $2\omega$ = 8.3° | | | |
|---|---|---|---|---|
| | r | d | Abbe | n |
| 1 | 112.780 | 17.60 | 82.6 | 1.49782 |
| 2 | 2634.455 | .30 | | |
| 3 | 108.261 | 18.10 | 82.6 | 1.49782 |
| 4 | −397.703 | 3.50 | | |
| 5 | −332.243 | 4.70 | 35.2 | 1.74950 |
| 6 | 383.650 | 28.87 | | |
| 7 | 84.625 | 2.20 | 55.6 | 1.69680 |
| 8 | 38.764 | 15.00 | 70.4 | 1.48749 |
| 9 | 210.869 | 4.00 | | |
| 10 | 471.818 | 8.40 | 33.9 | 1.80384 |
| 11 | −78.537 | 2.00 | 60.7 | 1.60311 |
| 12 | 98.621 | 5.10 | | |
| 13 | −159.458 | 2.00 | 52.3 | 1.74810 |
| 14 | 69.682 | 13.90 | | |
| 15 | 146.361 | 6.90 | 69.9 | 1.51860 |
| 16 | −69.719 | 1.60 | | |
| 17 | −50.689 | 6.50 | 25.4 | 1.80518 |
| 18 | −200.551 | 5.50 | | |
| 19 | −295.108 | 5.60 | 28.2 | 1.74000 |
| 20 | −64.433 | 39.20 | | |
| 21 | ∞ | 2.00 | 64.1 | 1.51680 |
| 22 | ∞ | Bf = 77.67 | | | where symbol r represents the curvature radius of each of the lens surfaces, symbol d represents the interval between lens surfaces, symbols Abbe and symbol n respectively represent the Abbe's number and the refractive index with respect to the line d ($\lambda = 487.6$ nm), numeral positioned at the left ends represent the order from the object, symbol f represents the focal distance of the overall body of the system, symbol FNO represents the F-number and symbol $2\omega$ represents the field angle.

* * * * *